US007925306B2

(12) United States Patent
Carmody et al.

(10) Patent No.: US 7,925,306 B2
(45) Date of Patent: Apr. 12, 2011

(54) SYSTEM AND METHOD FOR PROVIDING A PREVIEW OF MESSAGE CONTENT ON A MOBILE DEVICE

(75) Inventors: Michael James Carmody, Waterloo (CA); Anthony Fabian Scian, Waterloo (CA); Ian Michael Robertson, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 365 days.

(21) Appl. No.: 11/622,566

(22) Filed: Jan. 12, 2007

(65) Prior Publication Data

US 2008/0171535 A1 Jul. 17, 2008

(51) Int. Cl.
*H04B 1/38* (2006.01)
*H04M 1/725* (2006.01)
*H04W 4/00* (2009.01)
*G06F 3/033* (2006.01)
*G09G 5/36* (2006.01)

(52) U.S. Cl. .................. 455/566; 455/412.2; 455/412.1; 455/466; 345/553; 345/157

(58) Field of Classification Search ............... 455/435.1, 455/414.1, 566, 412.2, 556.1, 455, 412.1, 455/466; 345/619, 629, 157, 553; 340/7.22, 340/7.31; 715/711
See application file for complete search history.

(56) References Cited

U.S. PATENT DOCUMENTS

| | | | | |
|---|---|---|---|---|
| 5,528,259 A * | 6/1996 | Bates et al. | .................. | 345/676 |
| 5,828,837 A * | 10/1998 | Eikeland | ...................... | 709/202 |
| 5,835,084 A * | 11/1998 | Bailey et al. | .................. | 715/783 |
| 5,995,101 A * | 11/1999 | Clark et al. | .................... | 715/711 |
| 6,593,949 B1 * | 7/2003 | Chew et al. | .................... | 715/841 |
| 7,099,700 B2 * | 8/2006 | Hwang et al. | .................. | 455/566 |
| 7,250,955 B1 * | 7/2007 | Beeman et al. | ................. | 345/592 |
| 2004/0248573 A1 * | 12/2004 | Wandel | ....................... | 455/435.1 |
| 2006/0061597 A1 * | 3/2006 | Hui | ................................ | 345/629 |
| 2006/0265665 A1 * | 11/2006 | Yoshida | ......................... | 715/781 |
| 2007/0011258 A1 | 1/2007 | Khoo | | |
| 2007/0038718 A1 * | 2/2007 | Khoo et al. | .................... | 709/206 |
| 2007/0287432 A1 * | 12/2007 | Jung | ........................... | 455/414.1 |
| 2008/0161045 A1 * | 7/2008 | Vuorenmaa | ................. | 455/556.1 |
| 2008/0180408 A1 * | 7/2008 | Forstall et al. | ................ | 345/177 |

FOREIGN PATENT DOCUMENTS

EP 1182600 2/2002
(Continued)

OTHER PUBLICATIONS

European Search and Examination Report. Application No. 07100465.9 Dated: Sep. 11, 2007.

(Continued)

*Primary Examiner* — Jinsong Hu
*Assistant Examiner* — Mong-Thuy Tran
(74) *Attorney, Agent, or Firm* — Bereskin & Parr LLP/S.E.N.C.R.L., s.r.l.

(57) ABSTRACT

Embodiments of a system and method for providing a preview of the content of messages (e.g. electronic mail messages) to users of mobile devices. A portion of the message body of a message associated with a user-identified list entry of a message list is shown in an area of a display screen (e.g. in a window) that overlaps the area in which one or more list entries of the message list is displayed.

15 Claims, 6 Drawing Sheets

FOREIGN PATENT DOCUMENTS

JP    10011265    1/1998

OTHER PUBLICATIONS

Mozilla, "Thunderbird Version 1.0.6", Jul. 16, 2005, p. 1.
Microsoft, "Outlook 2002", p. 1.
IBM, "Lotus Notes 7", Dec. 6, 2006, p. 1.
Opera, "Opera Browser 9.1", May 6, 2005, p. 1.
Written Opinion and International Search Report. International Application No. PCT/CA2007/002338. Dated: Mar. 19, 2008.
European Examination Report. Patent Application No. 07100465.9. Dated: Feb. 13, 2009.
European Communication Under Rule 71(3) EPC. Application No. 07100465.9. Dated: Oct. 21, 2009.
Cheng, Li-Te et al., "A Mobile User Interface for Threading, Marking, and Previewing Email", Collaborative User Experience Group, IBM T.J. Watson Research Center, Cambridge, MA 02142, Aug. 2003.

* cited by examiner

US 7,925,306 B2

SYSTEM AND METHOD FOR PROVIDING A PREVIEW OF MESSAGE CONTENT ON A MOBILE DEVICE

RELEVANT FIELD

Embodiments described herein relate generally to messaging applications for use with mobile devices, and more specifically to a system and method for providing a preview of the content of messages (e.g. electronic mail messages) to users of mobile devices.

BACKGROUND

Electronic mail ("e-mail") applications for mobile devices are typically provided as scaled-down versions of e-mail applications designed for desktop computing devices. However, the limited resolution and small display screens of mobile devices can affect, for example, the relative ease with which certain tasks are performed by users, the amount of information that may be displayed on a screen, and the manner in which that information is displayed.

For example, a summary of e-mail messages received by a user is often provided by a messaging application to users in the form of a list. The message list typically includes message details that are extracted from the headers of the received messages, such as, for example, at least one of the subject of the message, the sender's name and/or e-mail address, the time the message was sent, and the size of the message. Users wishing to examine the main content (e.g. text in the message body) of a particular message would generally need to initially select a message, and then open the message. Subsequently, after the message has been opened, the user can examine the contents of the message, and decide on the next course of action to take with respect to the message (e.g. send a reply, forward the message, store the message, delete the message).

However, opening individual messages in order to determine the desired action to be taken for each message in the message list, especially where there may be numerous messages for a user to consider, can be cumbersome and time-consuming for the user. This can be particularly tiresome where the messages are to be reviewed by the user on a mobile device, since the message selecting and opening actions are usually initiated by repetitive thumb movements.

In desktop messaging applications, a preview pane may be provided, separate from the area in which the message list is displayed. Within the preview pane, at least a portion of the main content of a selected message (e.g. text or images in the message body) is displayed to the user. Accordingly, the user need not open each message individually, in order to examine the contents of a message. Instead, the user may, for example, simply highlight individual message entries in a list of received messages, and preview the contents of a given highlighted message in the preview pane. If the information provided in the preview pane is sufficient to allow the user to determine what action should be taken with the message, then the action may usually be taken without opening the message. Unfortunately, due to the resource limitations of mobile devices, and in particular, the relatively small display screens typically associated with such devices, providing a dedicated space for a preview pane on a mobile device display may be neither practical nor feasible.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

DETAILED DESCRIPTION

Embodiments of the systems and methods described herein relate generally to messaging applications for use with mobile devices, and more specifically to a system and method for providing a preview of the content of messages (e.g. electronic mail messages) to users of mobile devices.

In one broad aspect, there is provided a method of providing a preview of message content in a display on a mobile device, the method comprising the steps of: displaying, in a first area of the display, a message list comprising at least one list entry, wherein each list entry provides details of a message associated with the respective list entry; determining a user-identified list entry from the message list; and displaying at least a portion of a message body of the message associated with the user-identified list entry in a second area of the display, such that the second area overlaps at least a part of the first area in which one or more list entries of the message list is displayed.

In another broad aspect, there is provided a system for providing a preview of message content in a display on a mobile device, wherein the system comprises a processor adapted to execute a software application programmed to: display, in a first area of the display, a message list comprising at least one list entry, wherein each list entry provides details of a message associated with the respective list entry; determine a user-identified list entry from the message list; and display at least a portion of a message body of the message associated with the user-identified list entry in a second area of the display, such that the second area overlaps at least a part of the first area in which one or more list entries of the message list is displayed.

Features of these and other aspects, and of a number of embodiments of systems and methods are described below.

The description of embodiments of the systems and methods described herein make reference to a mobile device, also known in the art as a mobile station. A mobile device is a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
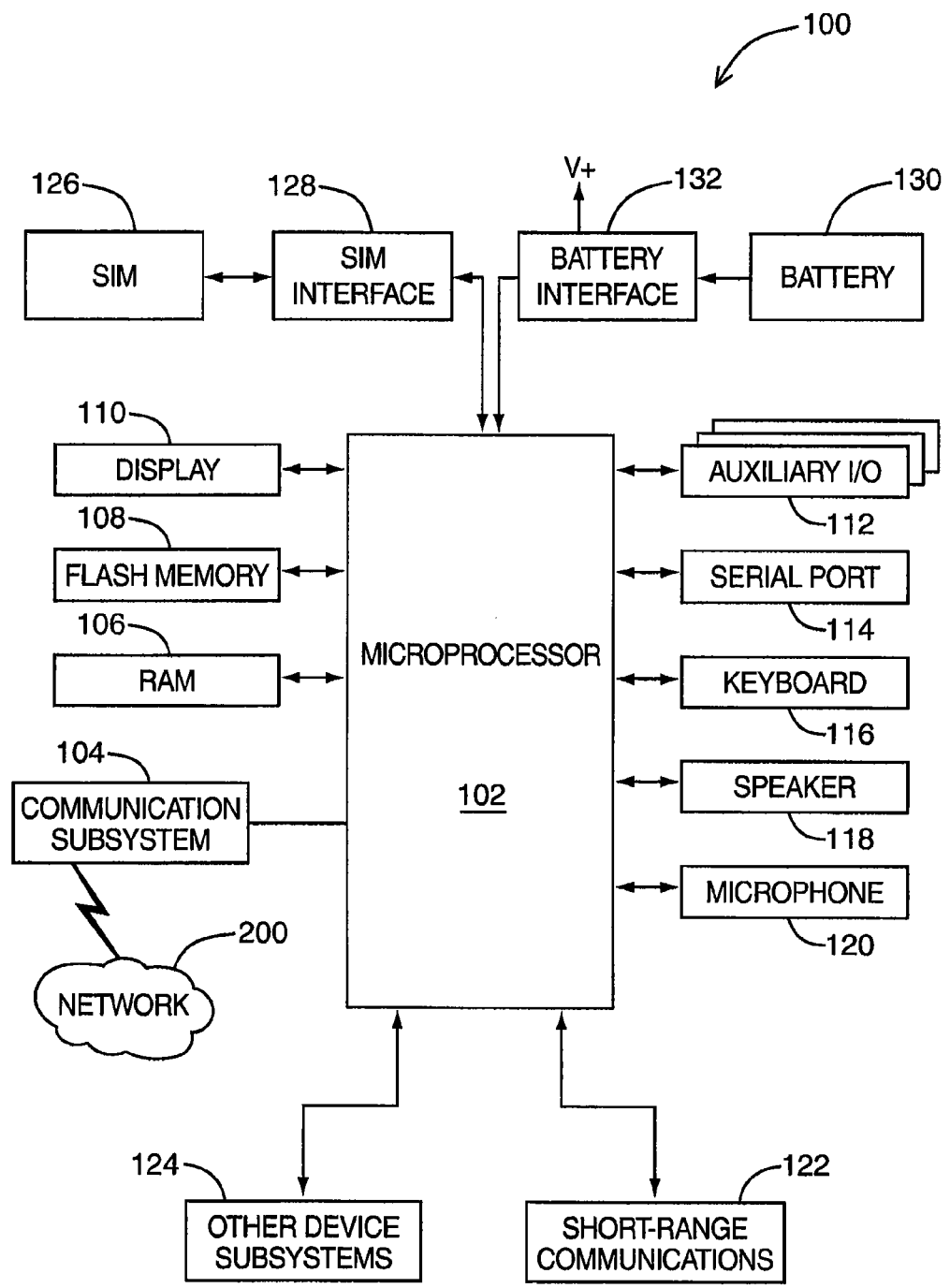
FIG. 1 is a block diagram of a mobile device in one example implementation.
Figure 2:
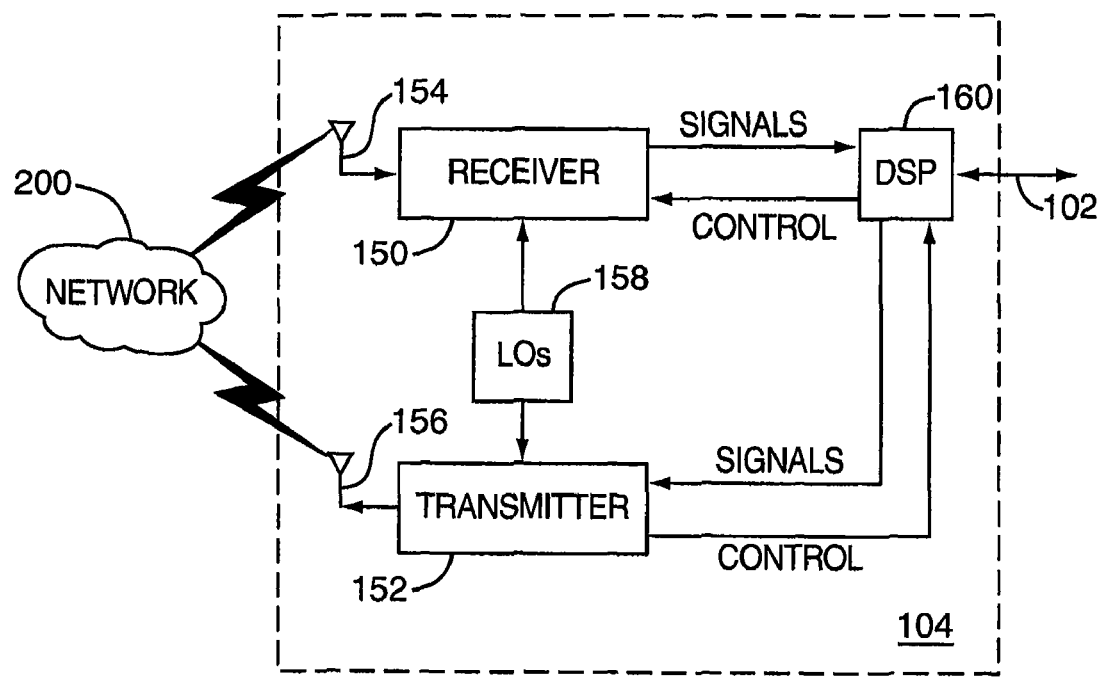
FIG. 2 is a block diagram of a communication subsystem component of the mobile device of FIG. 1.
Figure 3:
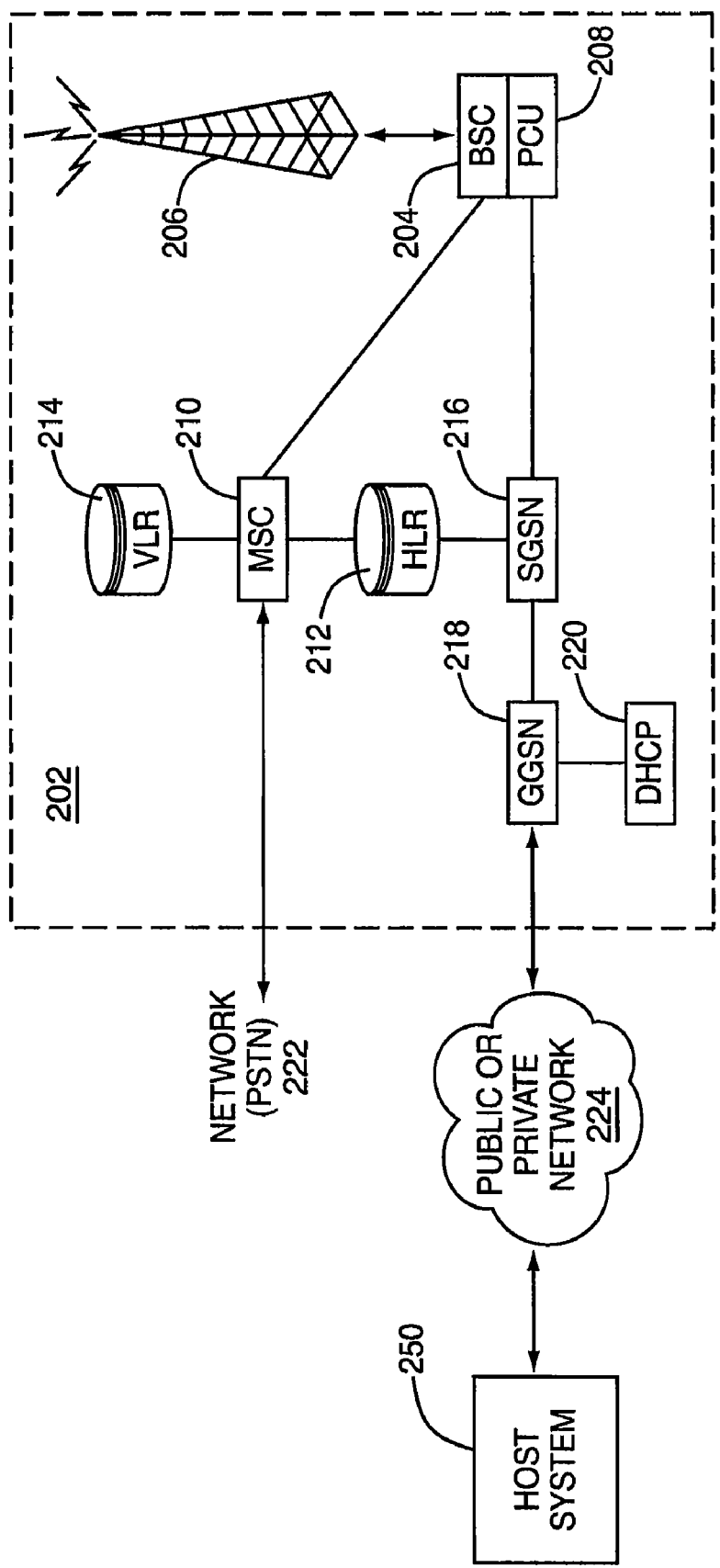
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Other network communication technologies that may be employed include, for example, Integrated Digital Enhanced Network (iDEN™), Evolution-Data Optimized (EV-DO), and High Speed Downlink Packet Access (HSDPA).

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound to any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, short-range communication subsystem 122 may include an infrared device and associated circuits and components for short-range communication. The short-range communication subsystem 122 can be used to communicate with a Wireless Personal Area network (WPAN). In some cases, the short-range communications subsystem 122 can comprise a Bluetooth radio, a ZigBee device, a Wireless USB (WUSB) device, and/or an Ultra-Wideband (UWB) radio, for example. Examples of short range communication standards include standards developed by the Infrared Data Association (IrDA), Bluetooth, ZigBee, WUSB, UWB, and the 802.11 and 802.15 families of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time require less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deal located and the IP address returned to the IP address pool managed by DHCP server 220.

Figure 4:
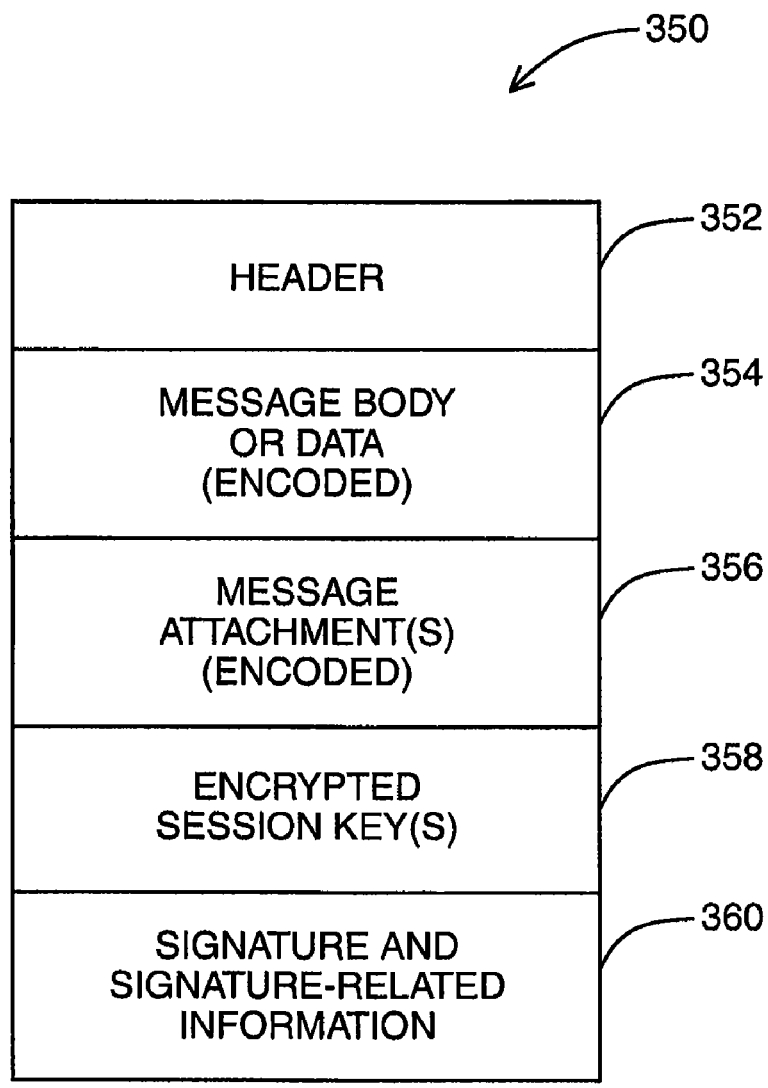
FIG. 4 is a block diagram illustrating components of an example of a message.

Referring now to FIG. 4, a block diagram illustrating components of an example of an encoded message, as may be received by a message server (not shown) and forwarded to a mobile device so that it may be considered by a user, is shown generally as 350. Encoded message 350 typically includes one or more of the following: a message header 352, an encoded message body 354, optionally one or more encoded attachments 356, one or more encrypted session keys 358, and signature and signature-related information 360.

For example, message header 352 typically includes addressing information such as "To", "From", and "CC" addresses, and may also include message length indicators, and sender encryption and signature scheme identifiers, for example. Message header 352 may also include additional information about the message, such as the time that it was sent, and a subject for the message. Actual message content normally includes a message body or data portion 354 and possibly one or more attachments 356, which may be encrypted by the sender using a session key. If a session key was used, it is typically encrypted for each intended recipient using the respective public key for each recipient, and included in the message at 358. If the message was signed, a signature and signature-related information 360 are also included. This may include the sender's certificate, for example.

The message format as shown in FIG. 4 is provided by way of example only, and persons skilled in the art will understand that messages may exist in other formats. Depending on the specific messaging scheme used, components of a message may appear in a different order than shown, and a message may include fewer, additional, or different components, which may depend on whether the message content is encoded, and if so, whether such encoded message content is encrypted, signed or both. For example, a message that does not contain encoded content may simply have a message header, a message body, and optionally one or more attachments, all of which are not encoded.

When a message (e.g. an e-mail message) is to be received by a user of a mobile device, the message may first be directed to a message server, and subsequently forwarded to the mobile device, possibly via a second server adapted to process and manage data being transmitted to and from the mobile device. In known manner, the message might be sent in blocks, truncated, re-formatted, or otherwise processed before it is sent to the mobile device.

A messaging application executing and residing on the mobile device then further processes received messages, and displays the details of the messages for consideration by the user. It will be understood that if a received message comprises encrypted content, at least some of the message content in the message body and/or one or more attachments may be decrypted at the mobile device before it is displayed to the user. The messaging application will also typically be adapted to permit users to send replies, forward messages, store messages, and delete messages stored on the mobile device, for example.

Many known messaging applications provide users with the option to configure and customize the manner in which information on sent, received, and saved messages is displayed to users. Typically, the flexibility in configuring the elements of a user interface that is provided to display such information is generally greater when the messaging application executes on a desktop or laptop computer rather than on a mobile device. This may be attributed to the fact that the display screen accompanying a desktop or laptop computer is usually large, relative to display screens typically associated with mobile devices.

For example, users may configure the messaging application executing on a desktop or laptop computer to divide a display screen into several areas. These may include, for instance, one area (e.g. window) where a directory of folders may be displayed, another area where a message list comprised of list entries (e.g. details of each message in the "Inbox" mail folder may be provided in a corresponding list entry) may be displayed, and another area ("preview pane") where at least a portion of the main content of a selected message (e.g. in the message body) may be displayed. Typically, with respect to display screens used with desktop or laptop computers, a window displayed by the messaging application may be resized to occupy a portion of the display screen, or the full screen.

In contrast, where the messaging application is adapted for use with a mobile device, flexibility in the configuration of elements of the user interface is typically much more limited. The size of the display screen associated with a mobile device is typically smaller. Accordingly, dividing the display screen into several areas (e.g. windows) so that different folder and message views may be displayed is often impractical. In particular, providing a dedicated space for a preview pane on a mobile device display screen may not be feasible.

More typically, when providing a user with the facility to review received messages, the full screen is used to initially display a message list comprised of list entries to the user. In general, in this message list view, the message list provides a summary of all of the messages in one or more message folders (e.g. all messages received by the user, as stored in the user's "Inbox"). If the user wishes to examine the content of a particular message (e.g. the text in the message body), the user will select the message for opening. Once the message has been opened, the content of the message (or, initially, a portion thereof depending on the message length) is displayed, in a new message view that replaces the message list view. If the user wishes to return to the message list view, the user will close the message that is currently open.

While a message is opened, the user can examine the content and decide on the next course of action to take with respect to the message (e.g. send a reply, forward the message, store the message, delete the message). However, opening individual messages in order to determine the desired action to be taken for each message in a message list, especially where there may be numerous messages for a user to consider, can be cumbersome and time-consuming for the user. As previously noted, this can be particularly tiresome where the messages are to be reviewed by the user on a mobile device, since the message selecting and opening actions are usually initiated by repetitive thumb movements.

At least some of the embodiments described herein are directed to a system and method for providing a preview of the content of messages (e.g. e-mail messages) to users of mobile devices.

Figure 5A:
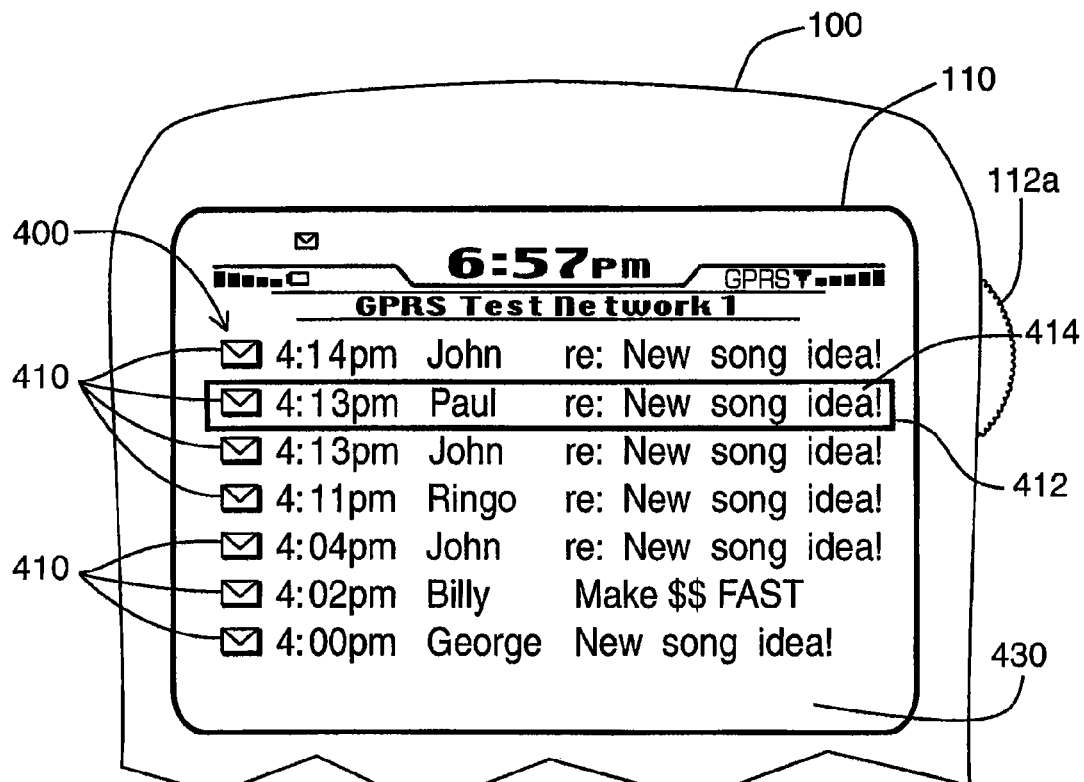
FIGS. 5A and 5B illustrate examples of screenshots of a user interface provided by an application executing on a mobile device in one exemplary embodiment.
Figure 5B:
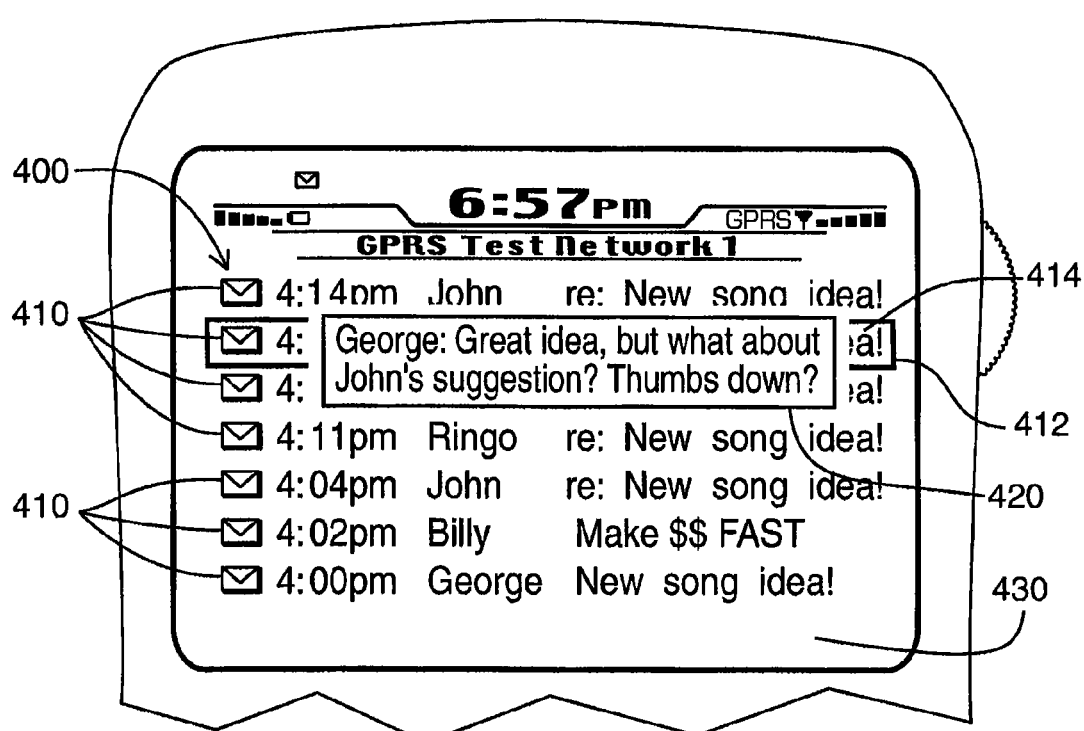

Referring to FIGS. 5A and 5B, examples of screenshots of a user interface provided by an application executing on a mobile device in one exemplary embodiment are shown. In this embodiment, the application executing on the mobile device is a messaging application.

In FIG. 5A, a message list 400 displayed by the messaging application in a display 110 of mobile device 100, in a message list view, is shown. In this example, message list 400 comprises multiple list entries 410, where each message that has been received by the user at the mobile device 100 and stored in the user's "Inbox" folder is associated with one of the list entries 410. Each list entry 410 in the message list 400 provides details of the message associated with the respective list entry 410. The details provided by a list entry 410 may be extracted from the message header (e.g. 352 of FIG. 4) of the message associated with the list entry 410, such as the name of the sender and subject of the message, for example. Other details may also be provided, including for example, the time the message was received at the mobile device, or an icon indicating whether or not the message has been opened ("read") by the user.

The details that are to be provided by the list entries 410 of message list 400 in the message list view may be configurable by the user. Message list 400 permits users to browse through a summary of messages received at mobile device 100, and to select messages of interest for opening so that the contents (e.g. of the message body 354 of FIG. 4) of the message may be read.

In this example, the user uses a trackwheel 112a on mobile device 100 to manipulate a highlight bar 412 in display 110. By rotating trackwheel 112a, highlight bar 412 may be re-positioned to highlight different list entries 410 of message list 400. Once the user identifies a specific list entry 414, manipulating the trackwheel 112a so that the highlight bar 412 settles on that specific list entry 414, the user may then take further action in respect of the message associated with that list entry 414. For example, the user may click the trackwheel 112a to reveal an option menu [not shown], from which the user may choose to open, save, reply, forward, or delete the message associated with the user-identified list entry 414.

As shown in FIG. 5B, in accordance with one exemplary embodiment, once a specific list entry 414 is identified by the user with the highlight bar 412 settled on that specific list entry 414, if the user has not taken any specific further action (e.g. by revealing the option menu) and a pre-determined time period has elapsed (e.g. 2 seconds), the messaging application displays a preview of the content of the message associated with the user-identified list entry in an area 420 that overlaps at least a part of the area in which the list entries 410 of the message list 400 is displayed. Generally, the preview comprises at least a portion of the message body of the message associated with the user-identified list entry 414. This may allow the user to quickly determine whether a given message requires immediate attention, or whether it needs to be opened for more detailed consideration, for example.

In one embodiment, the area 420 in which the preview of content of the message associated with the user-identified list entry 414 is displayed will overlap at least part of the user-identified list entry 414, as the user is likely to have already considered the details of the user-identified list entry 414. Typically, area 420 will also overlap at least part of other list entries 410 adjacent to or otherwise in the vicinity of the user-identified list entry 414. However, in variant embodiments, area 420 may overlap list entries 410 of the message list 400 that do not include the user-identified list entry 414.

Typically, once the highlight bar 412 is moved from a given list entry 414, that list entry 414 is no longer considered as identified by the user, and accordingly, the message preview in area 420 for the message specifically associated with that list entry 414 ceases to be displayed, thereby revealing previously covered details of one or more list entries 410 of message list 400.

As different list entries 410 in message list 400 are identified (e.g. with highlight bar 412) by the user (e.g. in scrolling through message list 400), a preview of each message associated with the current user-identified list entry may be similarly displayed in a new area [not shown], where its position may be dependent on the specific list entry 410 identified by the user.

Optionally, an area above the message list 400 and/or a blank area 430 at the end of message list 400 may also be provided, such that when highlight bar 412 is moved into such areas in which a list entry 410 is not displayed, no message preview is displayed.

The features in the exemplary embodiment described with reference to FIGS. 5A and 5B, are described in combination by way of example only. The features may be provided independently and/or in other combinations in variant implementations. These and other features, in accordance with a number of embodiments, are described in greater detail below.

In a broad aspect, embodiments described herein relate to a system and method for providing a preview of message content in a display on a mobile device, which does not require the use of a preview pane separate from the area in which list entries of a message list are displayed. This may have particular advantages when implemented on smaller display screens, such as those typically provided with mobile devices, for example.

A message list comprising at least one list entry is displayed in a first area of the display. Each list entry provides details of a message associated with that list entry. Each associated message will generally have a message header and a message body. Typically, some details obtained from the message header for a given message will be provided in the list entry with which that message is associated. A user-identified list entry from the message list is then determined, and subsequently, at least a portion of the message body (also referred to herein as a "preview") of the message associated with the user-identified list entry is displayed in a second area of the display. This second area overlaps at least a part of the first area in which the one or more list entries of the message list is displayed.

The portion of the message body provided as a preview of the message may comprise text (one or more lines), images, and/or data in other forms.

Contents of an attachment to a message may also be provided as a preview, and shall be deemed to constitute a portion of the message body that may be displayed in the second area for the purposes of this description, including the specification and in the claims. A description of the content of the message (e.g. "Attachment abc.doc—85 kB") may also be provided as a preview, and shall be deemed to constitute a portion of the message body that may be displayed in the second area for the purposes of this description, including the specification and in the claims.

In some embodiments, the portion of the message body that constitutes the preview is displayed in a window. Accordingly, the window overlaps at least a part of the first area in which one or more list entries of the message list is displayed. The window may or may not have a visible frame or outline. The window may have a background that is non-transparent, such that the details of the underlying list entries covered by the overlapping window are not visible when the window is displayed. In variant embodiments, the window may be transparent or semi-transparent, allowing the underlying details of list entries covered by the window to be visible, in varying degrees.

The portion of the message body that is displayed in the second area (e.g. the window) may comprise the entire contents of the message body. However, depending on the length of the message, typically only some of the contents of the message body will be displayed as a preview.

In some embodiments, the contents of the message body displayed in the second area may be displayed as scrolling content, allowing additional content to be displayed to the user. The content may be scrolled in a vertical direction, in a horizontal direction, or in some other manner, in variant embodiments. For example, in variant embodiments, the second area may be sized to display a single line of scrolling text, in a ticker-tape fashion.

Message content may be scrolled within the second area in response to user input, or it may be performed automatically. Where message content is to be scrolled automatically after a preview of the message is displayed, this may be performed after a certain delay period has elapsed, or immediately after the preview is displayed.

A user-identified list entry from the message list is determined by establishing which list entry of the message list, if any, has been identified by the user using a selection means provided by the application of the mobile device.

For example, the selection means may be a highlight bar (see e.g. FIGS. 5A and 5B), a pointer, or other cursor or selection tool, in variant embodiments.

In some embodiments, the portion of the message body displayed as a preview is performed after a specific list entry has been identified by the user, and a first, pre-determined time period ("hover time") has elapsed without the user having performed some other action (e.g. moving the selection means to identify a different list entry, opening the message, exiting the message list view, etc.). In respect of this delay feature, the user selection means may be considered to be "hovering" over a specific list entry, which triggers the display of the preview of the message associated with that specific list entry. The hover time may be user-configurable and/or fixed by the application. By way of example only, the hover time may be defined to be within the range of 0 to 10 seconds.

In some embodiments, after a second, pre-determined time period (e.g. "auto-open time") has elapsed, the message associated with the user-identified list entry may be opened automatically. This feature may be implemented independently of other delay features. However, in embodiments where a hover time is also defined, the auto-open time will typically be set to elapse only after the hover time has already elapsed. The auto-open time may be user-configurable and/or fixed by the application. By way of example only, the auto-open time may be defined to be within the range of 10 to 60 seconds.

In some embodiments, after a third, pre-determined time period (e.g. "auto-more time") has elapsed, at least one additional portion of the message body of the message associated with the user-identified list entry may be displayed. For example, a subsequent block of the message body content may be displayed after the auto-more time has elapsed. As a further example, after the auto-more time has elapsed, further content of the message body displayed as a preview may be automatically scrolled, as indicated earlier in this specification.

This foregoing feature may be implemented independently of other delay features. However, in embodiments where a hover time is also defined, the auto-more time will typically be set to elapse only after the hover time has already elapsed. Furthermore, in embodiments where an auto-open time is also defined, the auto-open time will typically be set to elapse only after the auto-more time has already elapsed. The auto-more time may be user-configurable and/or fixed by the application. By way of example only, the auto-more time may be defined to be within the range of 0 to 20 seconds.

When the user-identified list entry is no longer identified by the user, insofar as the selection means ceases to identify a given list entry from the message list being displayed (e.g.

selection means moved to identify a different list entry, scrolling beyond list entries in message list, change to a different view screen, etc.), the display of the portion of the message body being displayed as a preview for the message associated with that list entry is terminated.

In some embodiments, a message associated with a particular list entry of the message list that is identified by the user may automatically be marked as "read", once that list entry is identified by the user. In variant embodiments, a message associated with the list entry of the message list that is identified by the user may be marked as "read" only if all of the content of the message body associated with user-identified list entry has been displayed in the preview window or other area.

In variant embodiments, a preview of a message may be displayed only if the message has not been marked as "read".

In certain implementations, an application may be configured by the user or by another party (e.g. an administrator through a security policy) so that a preview feature provided in accordance with an embodiment described herein may be activated or de-activated.

Figure 6:
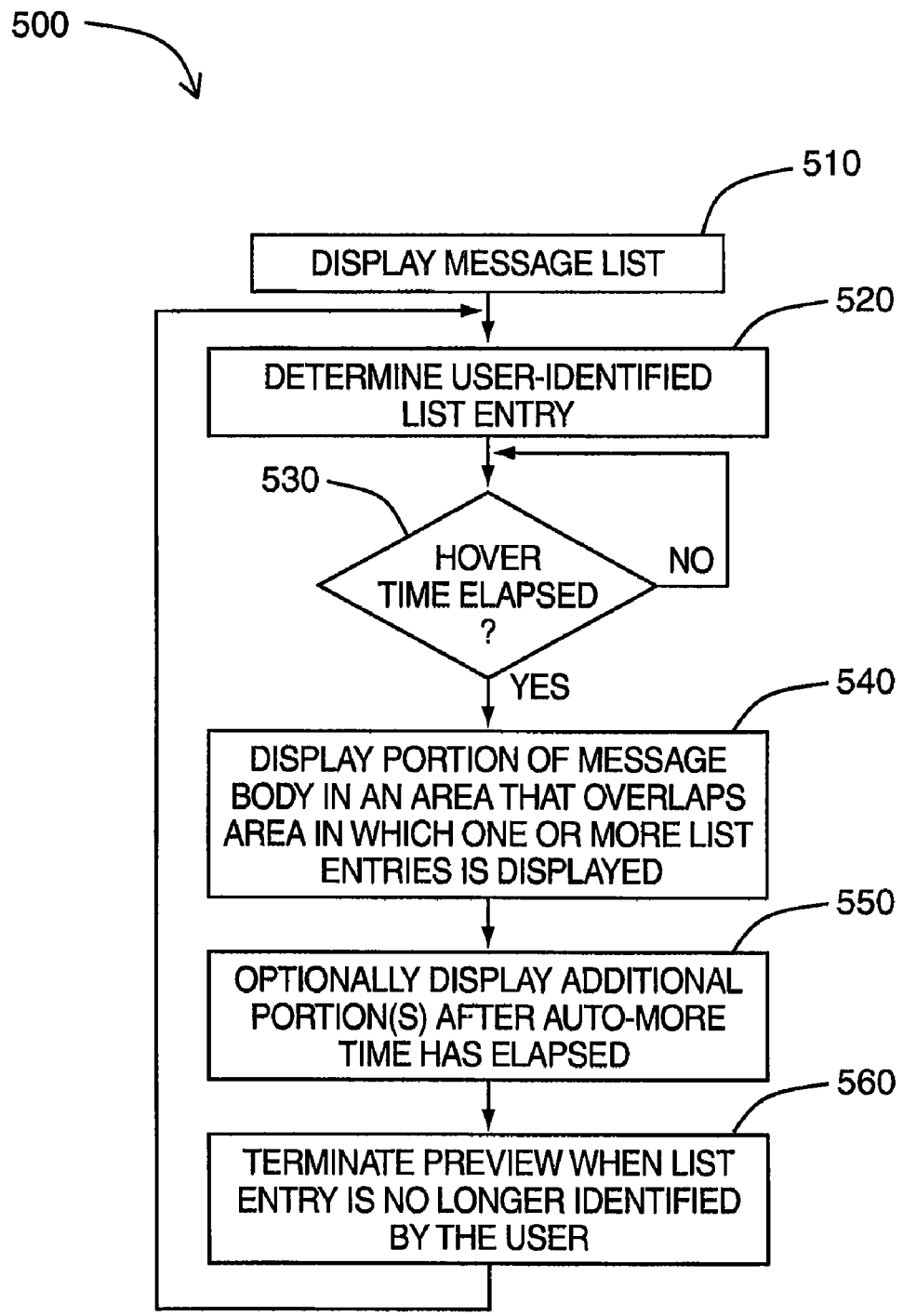
FIG. 6 is a flowchart illustrating steps of a method of providing a preview of message content on a mobile device in at least one exemplary embodiment.

Referring to FIG. 6, a flowchart illustrating steps of a method of providing a preview of message content on a mobile device in at least one exemplary embodiment is shown generally as 500.

Some of the features in this exemplary embodiment have been described earlier in this description, and the reader is directed to the relevant paragraphs therein for additional details in respect of method 500.

In this example, unless otherwise specified, the steps of method 500 are performed by an application, such as a messaging application, executing on a mobile device (e.g. mobile device 100 of FIG. 1).

At step 510, a message list is displayed in a display screen (e.g. display 110 of FIG. 1) of the mobile device. Typically, in a message list view, the message list provides a summary of all messages (e.g. e-mail messages) in one or more message folders.

For example, the message list may provide a summary of all e-mail messages in the "Inbox" folder on the mobile device. When the folder is not empty, the message list will comprise at least one list entry. Each list entry provides details of a message in the "Inbox" folder. At least some of the details will typically be extracted from the message header of the respective message. The types of information shown in a list entry may be user-configurable.

Given the relatively small size of display screens typically associated with mobile devices, the message list may be displayed in a message list view that occupies the entire display screen. However, in variant embodiments, the message list may be displayed in an area that partially occupies the display screen.

The user will typically be provided with a selection means, such as a highlight bar, a pointer, a cursor, or other means, to identify and select list entries in the message list. This selection means may be re-positioned at the direction of the user, using an input device such as a trackwheel, keyboard, mouse, or other input device.

At step 520, a list entry from the message list displayed at step 510 that has been identified by the user via the selection means (e.g. highlighted by a highlight bar) is determined.

At this point, the user may choose to select the user-identified list entry, and open an option menu from which the user may choose, for example, to open, save, reply, forward, or delete the message associated with the user-identified list entry. However, if the user takes no such action after identifying a particular list entry, the user selection means may be considered to be hovering over that list entry, which triggers the display of the preview of the message associated with that specific list entry, as noted below.

At step 530, the application determines whether a first, pre-determined time period ("hover time") has elapsed, with the particular list entry remaining identified by the user.

After the hover time has elapsed, at step 540, at least a portion of the message body is displayed in an area ("preview area") that overlaps, at least in part, the area in which one or more list entries (which typically includes, but does not necessarily include the particular list entry identified by the user) of the message list displayed at step 510 is displayed. Some or all of the message body content may be displayed at this step.

In variant embodiments, the portion of the message body is displayed in a window. The window overlaps, at least in part, the area in which one or more list entries of the message list displayed at step 510 is displayed.

In variant embodiments, the portion of the message body may be displayed as scrolling content (e.g. horizontal scrolling, vertical scrolling), within a window or other area.

It will be understood by persons skilled in the art that the preview window (or more generally, the preview area as may otherwise be defined) may have different shapes, sizes and/or may be in different positions and/or orientations, in variant embodiments. Factors such as the length of the message associated with the user-identified list entry, the position of the user-identified list entry in the message list, and the size of the message list, for example, may influence the dimensions and positioning of the preview window or other area within the display screen.

Optionally, a pre-determined "auto-more" time period may be defined. As shown at step 550, if this period elapses while the user-identified list entry determined at step 520 remains identified, additional portions of the message body of the message associated with the user-identified list entry may be displayed to the user. In variant embodiments, the additional portions may be provided to the user as scrolled content.

In variant embodiments, a pre-determined "auto-open" time period may be defined. If this period elapses while the user-identified list entry determined at step 520 remains identified, the message associated with the user-identified list entry may be automatically opened, typically in a new message view [step not shown].

At step 560, after it is determined that the user-identified list entry determined at step 520 is no longer identified by the user (e.g. selection means moved to identify a different list entry, change to a different view, scrolling beyond list entries in message list, etc.), the display of the portion of the message body being displayed as a preview for the message associated with that list entry is terminated. The preview area disappears, thereby revealing previously covered details of one or more list entries of the message list displayed at step 510.

In cases where the selection means has been moved to identify a different list entry, the flow of method steps may proceed back to step 520, where a list entry from the message list as identified by the user may be determined.

As previously noted, although there are certain advantages when features of the embodiments described herein are implemented in respect of mobile devices, it will be understood by persons skilled in the art that the features may also be implemented in respect of other computing devices.

The steps of a method of providing a preview of message content on a mobile device in embodiments described herein may be provided as executable software instructions stored on computer-readable media.

The invention has been described with regard to a number of embodiments. However, it will be understood by persons skilled in the art that other variants and modifications may be made without departing from the scope of the invention as defined in the claims appended hereto.

The invention claimed is:

1. A method of providing a preview of message content in a display on a mobile device, the method comprising:
   displaying a message list comprising at least one list entry, wherein each list entry provides details of an e-mail message associated with the respective list entry;
   receiving user input, provided by a selection element, that identifies a specific user-identified list entry from the message list;
   after a first pre-determined time period has elapsed without a user action having been performed since receiving the user input that identifies the user-identified list entry and with the user-identified list entry remaining user-identified, generating a message preview window to display at least a first portion of a message body of the e-mail message associated with the user-identified list entry, wherein the message preview window overlaps at least a part of the message list and the message preview window has a transparent or semi-transparent background allowing the underlying message list covered by the message preview window to be visible;
   after a further second pre-determined time period has elapsed without a user action having been performed since receiving the user input that identifies the user-identified list entry and with the user-identified list entry remaining user-identified, automatically displaying, in the message preview window, at least one additional portion of the message body of the e-mail message associated with the user-identified list entry; and
   automatically opening the e-mail message associated with the user-identified list entry in a new message view capable of displaying the rest of the e-mail message, after a third pre-determined time period has elapsed without a user action having been performed since receiving the user input that identifies the user-identified list entry.

2. The method of claim 1, wherein said portions of the message body are displayed as scrolling content in the message preview window.

3. The method of claim 2, wherein the scrolling content scrolls in a vertical direction.

4. The method of claim 2, wherein the scrolling content scrolls in a horizontal direction.

5. The method of claim 1, wherein the user-identified list entry is a list entry that has been identified using a highlight bar.

6. The method of claim 1, wherein the user-identified list entry is a list entry that has been identified using a pointer.

7. The method of claim 1, further comprising upon determining that the user-identified list entry is no longer user-identified, terminating the message preview window to display of the portion of the message body.

8. The method of claim 1, further comprising marking the e-mail message associated with the user-identified list entry as read.

9. The method of claim 1, wherein the user action comprises selecting the user-identified list entry and opening an options menu.

10. The method of claim 1, wherein the user action comprises moving the selection element to identify a different list entry of the at least one list entry.

11. The method of claim 1, wherein the user action comprises exiting a view of the message list.

12. The method of claim 1, wherein the user action comprises opening the e-mail message associated with the user-identified list entry.

13. The method of claim 1, wherein the message preview window has a visible frame or outline.

14. A non-transitory computer-readable medium on which a plurality of executable instructions is stored, the instructions, which when executed, cause a process to perform acts of a method of providing a preview of message content in a display on a mobile device, the method comprising:
   displaying a message list comprising at least one list entry, wherein each list entry provides details of an e-mail message associated with the respective list entry;
   receiving user input, provided by a selection element, that identifies a specific user-identified list entry from the message list;
   after a first pre-determined time period has elapsed without a user action having been performed since receiving the user input that identifies the user-identified list entry and with the user-identified list entry remaining user-identified, generating a message preview window to display at least a first portion of a message body of the e-mail message associated with the user-identified list entry, wherein the message preview window overlaps at least a part of the message list and the message preview window has a transparent or semi-transparent background allowing the underlying message list covered by the message preview window to be visible;
   after a further second pre-determined time period has elapsed without a user action having been performed since receiving the user input that identifies the user-identified list entry and with the user-identified list entry remaining user-identified, automatically displaying, in the message preview window at least one additional portion of the message body of the e-mail message associated with the user-identified list entry; and
   automatically opening the e-mail message associated with the user-identified list entry in a new message view capable of displaying the rest of the e-mail message, after a third pre-determined time period has elapsed without a user action having been performed since receiving the user input that identifies the user-identified list entry.

15. A system for providing a preview of message content in a display on a mobile device, wherein the system comprises a processor adapted to execute a software application programmed to:
   display a message list comprising at least one list entry, wherein each list entry provides details of an e-mail message associated with the respective list entry;
   receive user input, provided by a selection element, that identifies a specific user-identified list entry from the message list;
   after a first pre-determined time period has elapsed without a user action having been performed since receiving the user input that identifies the user-identified list entry and with the user-identified list entry remaining user-identified, generate a message preview window to display at least a first portion of a message body of the e-mail message associated with the user-identified list entry, wherein the message preview window overlaps at least a part of the message list and the message preview window has a transparent or semi-transparent background allowing the underlying message list covered by the message preview window to be visible;
   after a further second pre-determined time period has elapsed without a user action having been performed since receiving the user input that identifies the user-identified list entry and with the user-identified list entry remaining user-identified, automatically display, in the message preview window, at least one additional portion of the message body of the e-mail message associated with the user-identified list entry; and to
automatically open the e-mail message associated with the user-identified list entry in a new message view capable of displaying the rest of the e-mail message, after a third pre-determined time period has elapsed without a user action having been performed since receiving the user input that identifies the user-identified list entry.

\* \* \* \* \*